F. C. PULLMAN.
FLOWER HOLDER ATTACHMENT.
APPLICATION FILED OCT. 29, 1917.
1,260,042.
Patented Mar. 19, 1918.
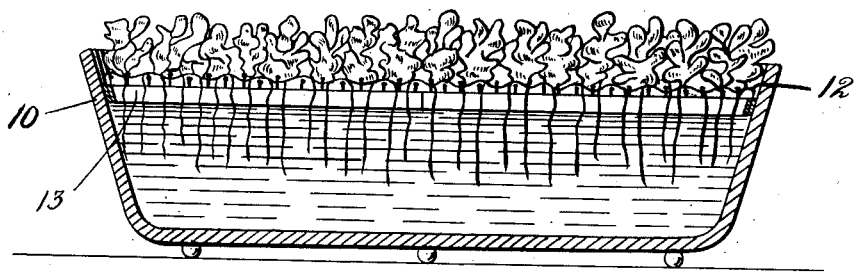
Fig. 1.
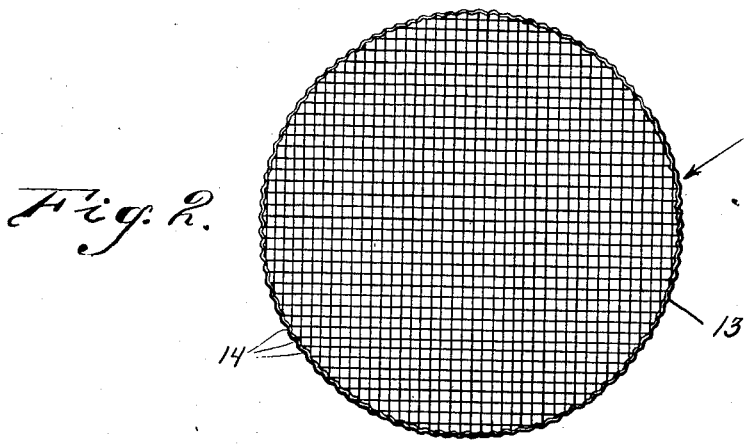
Fig. 2.
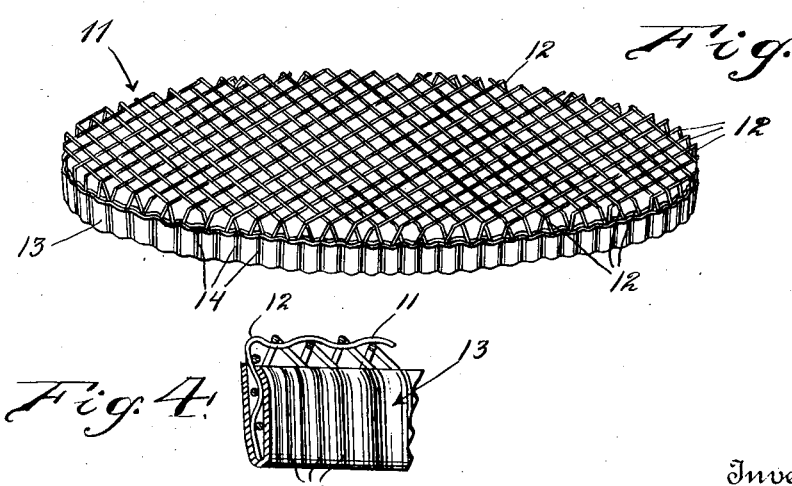
Fig. 3.
Fig. 4.
Inventor
Flora C. Pullman
Witnesses
By Victor J. Evans
Attorney

UNITED STATES PATENT OFFICE.

FLORA C. PULLMAN, OF CLEVELAND, OHIO.

FLOWER-HOLDER ATTACHMENT.

1,260,042. Specification of Letters Patent. Patented Mar. 19, 1918.

Application filed October 29, 1917. Serial No. 198,911.

*To all whom it may concern:*

Be it known that I, FLORA C. PULLMAN, a citizen of the United States, residing at Cleveland, in the county of Cuyahoga and State of Ohio, have invented new and useful Improvements in Flower-Holder Attachments, of which the following is a specification.

This invention relates to flower holders and aims to provide means for supporting cut flowers within a bowl or receptacle, to permit of their being arranged in a pleasing and artistic manner.

The invention comprehends the provision of means for supporting cut flowers within a bowl or receptacle, the supporting means being entirely covered by the flowers, so as not to detract from the artistic appearance or arrangement.

The invention further comprehends the provision of supporting means by which the flowers may be removed from the bowl or receptacle for the purpose of replacing the water, without disturbing the arrangement, the flowers remaining within the support during such operation.

For the accomplishment of the above purposes, the invention includes a support composed of reticulated material having its edges bent laterally and secured within an annular flange, the said flange being tapered for engagement with the side walls of the receptacle. The invention further provides novel means for securing the annular flange to the reticulated material, such means consisting of forming the flange of double thickness and crimping the laterally extending edges of the reticulated material therebetween.

In the drawings,

Figure 1 is a sectional view of a flower support embodying the present invention and shown in position within a flower bowl, this view further illustrating the manner of supporting the cut flowers therein;

Fig. 2 is a plan view, the flowers being removed;

Fig. 3 is a perspective view of the invention detached from the bowl; and

Fig. 4 is a fragmentary sectional view showing the crimping of the annular flange for its engagement with the edges of the reticulated flower support.

Referring to the drawings in detail, wherein like characters of reference denote corresponding parts, there is shown a bowl 10, which may be of any design or construction, the one shown being circular in plan, but it is understood that various shapes may be employed, such as oval, square, triangular or star shape. In fact, the bowl may be of any shape best adapted for the purpose. The bowl 10 is illustrated as tapered in cross-section and positioned within this bowl is the flower holder, which constitutes the present invention.

The holder includes the support or platform 11, formed of wire mesh, or other reticulated material. The mesh of this support may vary, the invention not being limited to any degree of fineness or mesh. The support 11 has its edge bent laterally as at 12 and secured around this edge is an annular flange 13, formed of a double thickness of material as shown. One method of forming the flange is by bending a strip of material centrally of its length and folding the same upon itself and connecting together the two ends. The laterally bent edge of the support 11 is then secured between the two thicknesses of material, the flange being crimped throughout its length as shown at 14 for the purpose of securing the bent edge 12 of the support therein.

The flange 13 is preferably tapered, that is, the diameter of one edge is relatively smaller than the diameter of the other edge so as to provide an inclined wall for engagement with the inner wall of the receptacle 10, the relative diameters of the flange 13 and the interior of the receptacle 10 being such that the flower holder will be spaced from the bottom of the receptacle, permitting of the stems being inserted through the support for contact with the water in the receptacle, the bloom of the flowers resting upon the support in the manner shown. By this means the flowers are supported within the bowl and arranged upon the support in a pleasing and artistic manner, the construction of the said support permitting of the arrangement of various designs. The invention also permits of the removal of the flowers for the purpose of replacing the water, without disturbing the design or arrangement of the flowers, the said flowers remaining upon the support during this operation.

Having described the invention, what is claimed is:

5   The combination of a receptacle having its inner side converging toward the bottom, a reticulated support having laterally bent edges and a converging annular flange crimped on said edges for engaging the inner side of the receptacle and being supported thereby.

In testimony whereof I affix my signature.

FLORA C. PULLMAN.